United States Patent [19]

Lovick et al.

[11] Patent Number: 4,494,143
[45] Date of Patent: Jan. 15, 1985

[54] TELEVISION DESCRAMBLER WITH SECURITY PLUG HAVING FOLDED FLEXIBLE PRINTED CIRCUIT BOARD PROVIDING TIER TAG MEMORY

[75] Inventors: Richard B. Lovick, Glendale; William L. Firestone, Sepulveda, both of Calif.

[73] Assignee: RCA Corporation, New York, N.Y.

[21] Appl. No.: 363,246

[22] Filed: Mar. 29, 1982

[51] Int. Cl.³ .................... H04N 7/16; H04K 1/04; H01R 33/30; H01R 13/62
[52] U.S. Cl. .................... 358/122; 200/51.09; 339/74 R; 339/75 R; 339/75 M; 339/75 MP; 339/82; 339/273 R; 339/273 F; 358/117
[58] Field of Search .................... 200/51.09; 399/74 R, 399/82, 75 R, 75 M, 75 MP, 273 R, 273 F; 358/117, 122, 123

[56] References Cited

U.S. PATENT DOCUMENTS

| | | |
|---|---|---|
| 2,664,734 | 1/1954 | McEneaney . |
| 2,733,416 | 1/1956 | Evalt . |
| 2,857,577 | 10/1958 | Vanderpool .................... 339/273 R |
| 3,478,301 | 11/1969 | Conrad et al. ................ 339/75 MP |
| 3,519,979 | 7/1970 | Bodenstein . |
| 3,576,515 | 4/1971 | Frantz ............................. 339/74 R |
| 3,760,130 | 9/1973 | Ross et al. . |
| 3,861,770 | 1/1975 | Horak . |
| 3,953,097 | 4/1976 | Graham . |
| 3,963,293 | 6/1976 | McKee . |
| 3,982,084 | 9/1976 | Cooperstein .................... 200/51.09 |
| 3,982,803 | 9/1976 | Bennett . |
| 4,053,195 | 10/1977 | Laverick et al. . |
| 4,143,933 | 3/1979 | Aitkins . |
| 4,168,921 | 9/1979 | Blanchard . |
| 4,225,884 | 9/1980 | Block et al. .................... 358/122 |
| 4,250,524 | 2/1981 | Tomizawa ........................ 358/122 |
| 4,264,114 | 4/1981 | Chandler . |
| 4,290,661 | 9/1981 | Burns . |

FOREIGN PATENT DOCUMENTS 0039685  4/1981  Japan .................... 358/122

OTHER PUBLICATIONS

U.S. patent application Ser. No. 340,452 filed Jan. 18, 1982 in the names of Williams and Masri.

*Primary Examiner*—S. C. Buczinski
*Attorney, Agent, or Firm*—E. M. Whitacre; P. J. Rasmussen; Richard G. Coalter

[57] ABSTRACT

A descrambler or decoder for premium scrambled television signals compares the tier of the received signal with the contents of a memory associated with the descrambler. The memory of each descrambler establishes the tiers which are to be decoded according to what the user of the descrambler has requested or paid the system operator for. The memory is in the form of a small plug which mates with a receptacle which is coupled to a tier comparator within the descrambler. The memory plug includes a predetermined circuit for each tier arrangement which a user or subscriber may request. Due to its small size and physical arrangement, the tier-establishing memory is resistant to tampering by the user, thereby preventing access to premium programming by unauthorized subscribers.

3 Claims, 14 Drawing Figures

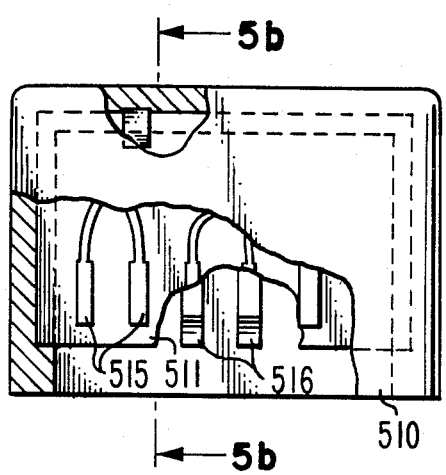
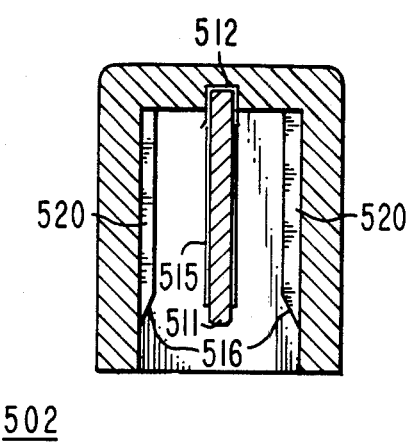
Fig. 5a          Fig. 5b
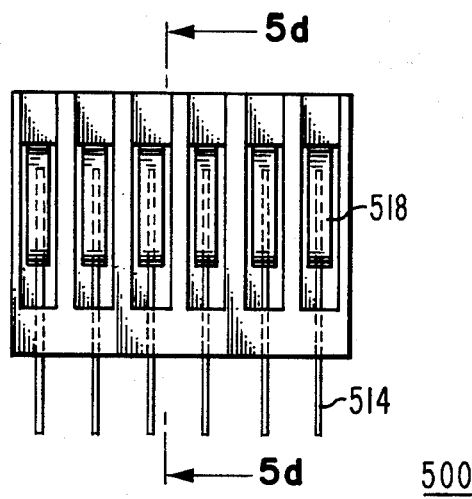
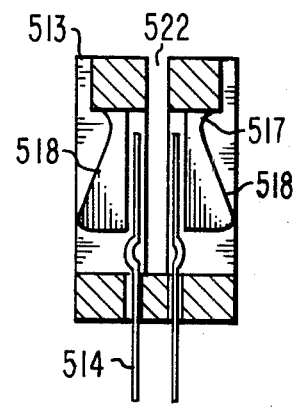
Fig. 5c          Fig. 5d

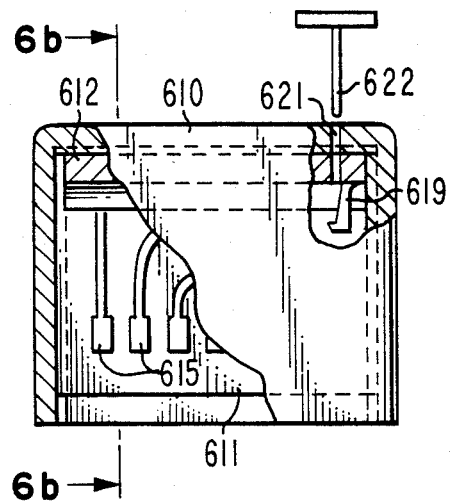
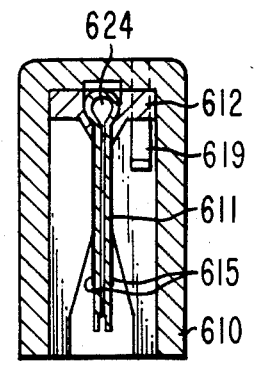
Fig. 6a  Fig. 6b
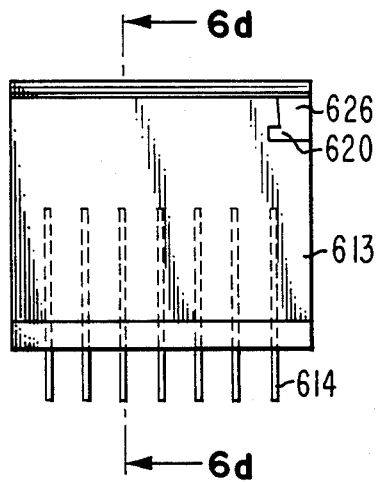
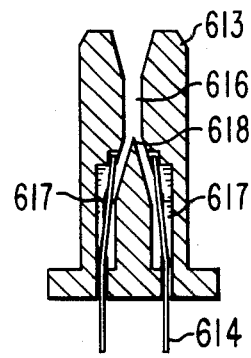
Fig. 6c  Fig. 6d

TELEVISION DESCRAMBLER WITH SECURITY PLUG HAVING FOLDED FLEXIBLE PRINTED CIRCUIT BOARD PROVIDING TIER TAG MEMORY

This invention relates to a security plug for tier decoder for establishing a tier level of a descrambler for comparison with the tier level of a television signal in a controlled-access television system such as in the premium-channel portion of a cable television system or in an over-the-air transmission channel.

Traditional broadcast services for radio and television are made available free to anyone with a radio or television receiver. The costs of producing information and entertainment for a receiver are borne by advertisers who pay the broadcast station operator for periodic announcements or advertisments hawking their wares. The periodic announcements may be annoying. It may be desirable for several reasons to provide television services in which access is limited to certain viewers. One reason for limiting access might be to restrict viewing of particular programs without advertisments to those subscribers who have paid to view the particular subject matter. Another reason may be in the desire to prevent the general public from viewing subjects which might be unsuitable, such as medical or surgical Operations broadcast for educational purposes, or materials unsuitable for young viewers.

In the infancy of cable television the limitation on viewing was established by the need to be connected to the cable in order to receive the distributed signals. Thus, viewers could be prevented from viewing signals by disconnecting them from the cable. Later, cable operators expanded their services above the twelve channels within the standard VHF broadcast channels by using signals within the mid-band and super-band regions lying between standard-broadcast channels 6 and 7, and above channel 13, respectivly. These signals could not be received by a viewer having ordinary television receiver even if the viewer were connected to the cable. A frequency converter could be supplied by the cable operator in order to convert the signals on nonstandard channels to standard-broadcast channels, thus enabling them to be displayed on an ordinary receiver. In This condition, a cable operator could maintain two tiers of service. A first tier would be open to anyone whose television receiver was connected to the cable for receiving standard-broadcast channels. A second tier would be available to those viewers who were supplied with frequency converters. The cable operator could, if he chose, charge an additional premium to those viewers to whom the converters were supplied. Presumably, the programs carried on the cable tv system on the nonstandard channels would be desirable enough to induce the viewer to pay a premium in order to view them with the aid of the converter.

Use of the converter to provide a second tier of service is relatively unsatisfactory. Firstly, a frequency converter can be stolen or duplicated readily, which invites piracy of a premium service. Secondly, the most effective use of the converter converts all the cable channels, both standard and nonstandard, to a fixed standard-broadcast channel, thereby obviating its usefulness in preventing access. As a result, various scrambling systems have come into use which convert or change the signals of a particular channel in some manner to prevent unauthorized viewing. Many such scrambling systems use attenuators which are synchronized with the television horizontal sync pulses. For example, one common scheme scrambles or encodes the television signal by reducing the amplitude of the television signal in a region around the horizontal sync pulses. Such processing makes it difficult or impossible for the receiver to lock horizontally, since the amplitude of the changing video exceeds the sync amplitude.

There has been a proliferation of premium services. Each premium service itself commands a fee. Consequently, a cable operator may desire to have a number of tiers of service, each corresponding to one of the premium services. A viewer may wish to pay for a particular grouping of premium services from the total premium services available on the particular cable system. A tier-controlled descrambler can provide such operation. In one such tiered scrambling system, each of the television signals of the various tiers is scrambled by suppression of the amplitude of the sync. Synchronizing information required in order to enhance the amplitude of the sync region is provided by pulse or sine-wave signals amplitude-modulated onto the aural carrier. A standard receiver ignores this synchronizing information, but the descrambler includes an arrangement for selecting the aural carrier and extracting the synchronizing information therefrom by means of an AM detector. The synchronizing signal when extracted is used to enhance amplitude of the sync region relative to the video signal so that horizontal synchronizing portions of a standard television receiver to which a signal is applied can operate normally, and a normal signal will be displayed.

In the aforementioned system, the information relating to the tier level of television signal with which the audio carrier is associated can also be carried by AM modulation on audio carrier. In this system, the tier level information is carried by the AM modulation of the audio carrier during an interval corresponding to eight horizontal lines near the end of the vertical blanking interval. In this known system, a single pulse may be associated with each of the eight horizontal lines carrying the tier information. The value of a pulse is determined by the horizontal line in which it appears. The value represented by the pulse in the various horizontal lines is in a binary progression. For example, a pulse amplitude-modulated onto the aural carrier during the 20th horizontal line might have a binary value of one, a pulse during the 21st horizontal line might have a binary value of two, and so forth until a pulse during horizontal line number twenty-eight would have a value of 128. Such pulses after being demodulated from the audio carrier must be applied to a shift register for storage, and processed in a decoder for comparison with one or more numbers stored within the system to determine whether the signals then be transmitted are of a tier that the particular descrambler in question is permitted to descramble (i.e. that the viewer using the particular descrambler has paid for).

In such systems, the tier level of the particular descrambler, i.e. the tier levels which it is permitted to decode, may be memorized as a pattern of conductors within the housing. There is a temptation for the user of the descrambler to open the housing and readjust the connections in order to receive tiers of service which have not been paid for. It is desirable to protect the tier programming of the descrambler in a manner readily changed by an authorized serviceman.

DESCRIPTION OF THE DRAWING

FIGS. 5a–d are illustrations, partly cut away, of a security tiering plug and matching socket or receptacle in front and side view;

FIGS. 6a–d are another plug and receptacle;

DESCRIPTION OF THE INVENTION

Figure 1:
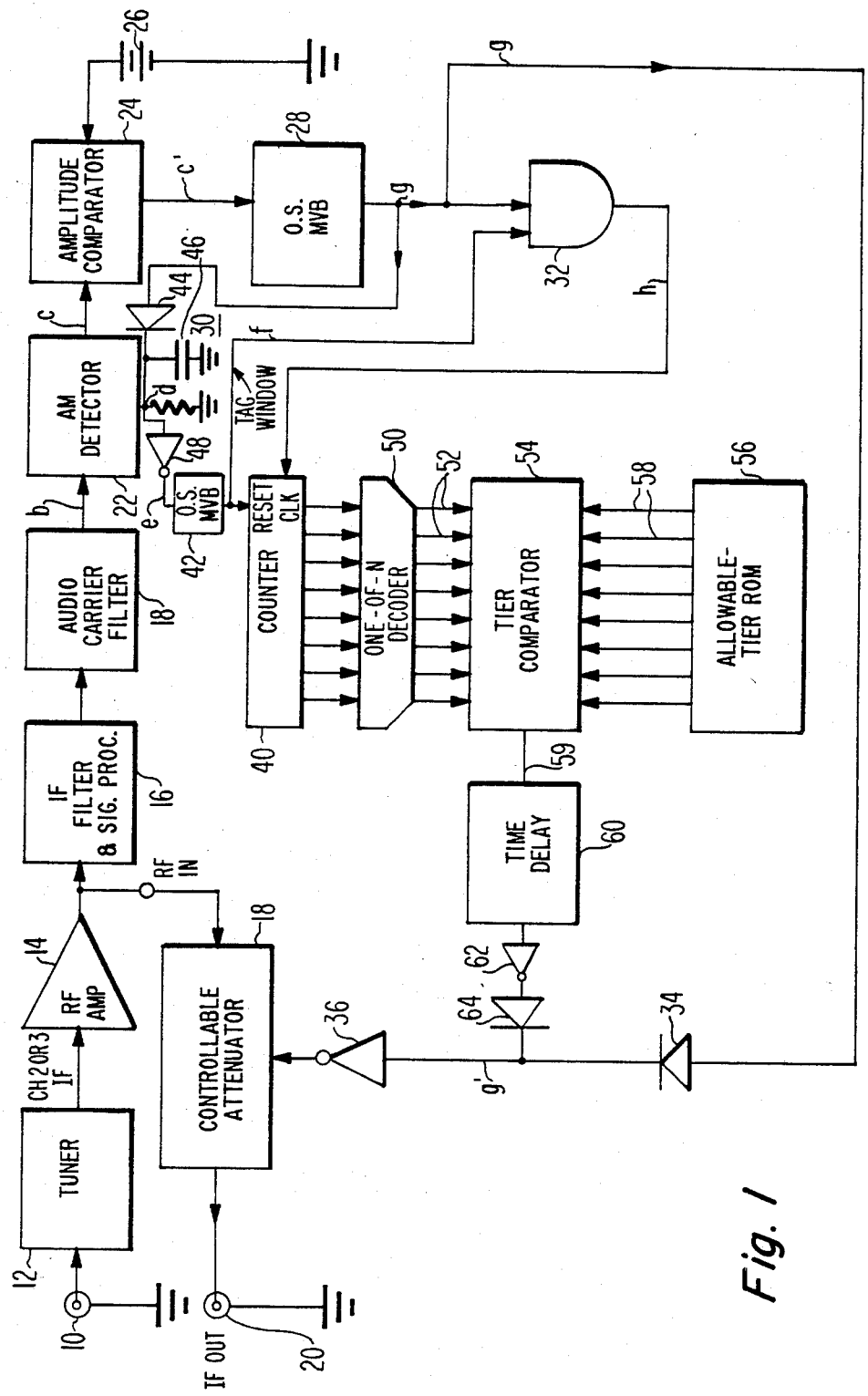
FIG. 1 is a diagram in block and schematic form illustrating a descrambler with pulse counting tier decoder in accordance with the invention.
Figure 2:
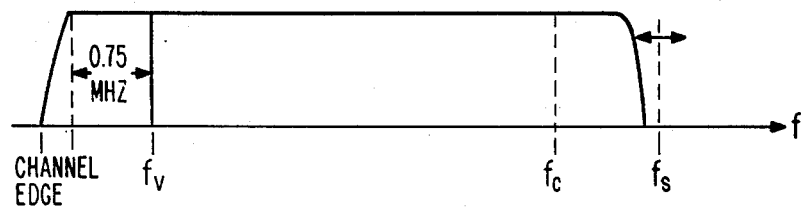
FIG. 2 illustrates a spectrum of a television channel as an aid in understanding the invention.

FIG. 1 illustrates a descrambler including a pulse counting tier decoder according to the invention. Radio-frequency (RF) signals are received from a source (not shown) at an RF input port 10 and are coupled to a tuned circuit or tuner 12, as required, in order to reject signals at other channels and if necessary to convert the selected signals to an intermediate frequency (IF). The IF signals are applied from tuner 12 to an RF amplifier 14 and the amplified signals are applied to an IF bandpass filter 16 and, by way of a controllable attenuator 18 to an output port 20. The signals selected by filter 16 sixteen are applied to an audio carrier bandpass filter 18 which allows the audio carrier associated with the channel signal to be coupled by a conductor b to an amplitude (AM) detector 22 which detects any amplitude modulation on the audio carrier and applies it over a conductor c to an amplitude comparator 24 for comparison with a reference voltage source illustrated as a battery 26 applied to a second input of the comparator. The output pulses of comparator 24 representing the pulsed amplitude modulation of the audio carrier are applied over a conductor c' to an input of a one-shot multivibrator (OSMVB) 28. Multivibrator 28 produces a pulse having a fixed duration such as forty microseconds ($\mu S$) for each pulse input. The fixed-duration pulses are applied over a conductor g to a pulse detector designated generally as thirty, to an input of an AND gate 32, and by way of a diode 34 and an inverting amplifier 36 to a control input of controllable attenuator 18. The positive-going pulse output of MVB 28 under certain conditions causes a negative-going pulse to be applied to the control input of attenuator 18, thereby causing periodic increases in the gain of the attenuator during the interval of the descrambling synchronizing pulses modulated onto the audio carrier. In this way, the RF or IF signals coupled between ports 10 and 20 through attenuator 18 have the amplitude of the signal enhanced during the sync interval, thereby descrambling the signal. The remainder of the arrangement of FIG. 1, including pulse detector 30 and AND gate 32, represents a tier decoder which inhibits the application of pulses to attenuator 18, thereby preventing descrambling from taking place when the television signal being processed is one which is not to be viewed by the person using the particular descrambler.

Figure 3:
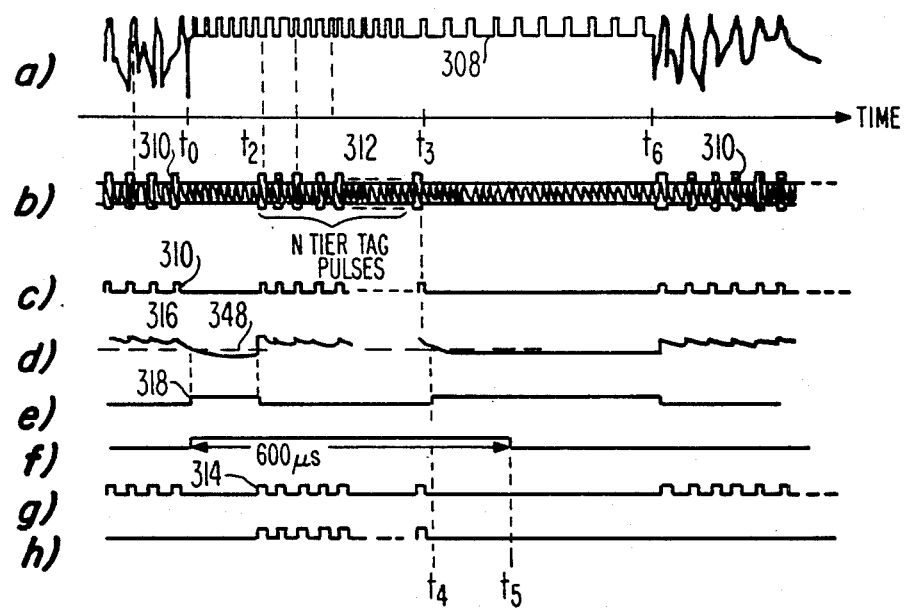
FIG. 3 is a timing diagram illustrating various voltage waveforms occuring in the arrangement of FIG. 1 during operation.

The tier level of the particular television signal being processed is identified by the number of pulses amplitude-modulated onto the audio carrier of the television signal within a particular interval. The particular interval selected lies within the vertical blanking interval (VBI). This region is suitable for insertion of such tier tag pulses onto the audio carrier because horizontal-rate descrambling synchronizing pulses are not necessary during the VBI and are not inserted. Thus, the VBI is free of horizontal-rate pulses required to operate attenuator 18 for descrambling, and can be used for the purpose of signal tier level identification or tagging. FIG. 3A illustrates a portion of a television signal 308 including the VBI, which extends from time t0 to time t6. FIG. 3B illustrates the amplitude modulation of the audio carrier signal associated with the television signal. At times preceeding time t0 and at times after time t6, the audio carrier is amplitude-modulated with synchronizing pulses 310 at the horizontal rate which as described are used for decoding. The VBI interval t0–t6 is free of such synchronizing pulses, but includes a number of tier tag pulses 312 which identify the tier level of the signal in question. For example, in an 8-tier system, a particular signal might include as many as 8 tier tag pulses or as few as 1. The absence of tier tag pulses would indicate a non-premium service. FIG. 3C illustrates the synchronizing pulses 310 and tier tag pulses 312 on conductor c after demodulation by detector 22. The pulses 314 of FIG. 3g represent the fixed-duration pulses on conductor g following MVB 28.

A binary counter 40 in FIG. 1 counts pulses 314 applied to its clock input circuit by way of AND gate 32 and conductor h. Counter 40 is reset after each recurrent time t0 and is enabled to receive tier tag pulses at its clock input by pulse-presence detector 30 in conjunction with OS MVB 42. A diode 44 coupled to conductor g allows pulses 314 to charge a capacitor 46 to produce a direct voltage on conductor d as illustrated by voltage 316 of FIG. 3D. A resistor causes relatively rapid discharge of capacitor 46 in the absence of recurrent pulses 314. Voltage 316 is applied to a comparator 48 for comparing voltage 316 with a reference voltage illustrated in FIG. 3d as dotted line 348 for thereby generating on a conductor e a signal illustrated in FIG. 3e as 318. During intervals preceeding time t0, pulses 314 occur regularly, and rectifier 44 maintains capacitor 46 fully charged and above the threshold level. Between time t0 and time t2, which is the beginning of the VBI, pulses 314 no longer appear and capacitor 46 discharges to below the threshold level, causing the output of comparator 48 to rise to a logic level 1 to trigger MVB 42 to produce a pulse having a predetermined duration of approximately 600 $\mu S$ on a conductor f for application to the reset input of counter 40 to reset the counter to 0, and to an input of AND 32 to enable the gate to pass tier pulses to the clock input of counter 40.

During the tier-pulse interval t2–t4 one or more tier pulses amplitude-modulated onto the audio carrier are demodulated by detector 22, cleaned up in comparator 24, stretched by MVB 28 and gated to the clock input of counter 44 for counting. During this same interval, the rectified voltage 316 again rises above reference voltage 348, and the comparator output signal on conductor e drops to logic 0. However, this does not affect the state of MVB 42, which has a fixed duration extending until a time t5, which is later than any expected tier tag pulse but before any synchronizing pulses of the next following active vertical interval (after t6). This assures that counter 40 receives only tier tag pulses for counting.

A one-of-N decoder is coupled to the binary counter to fully decode the counter output onto one of eight output conductors 52. Conductors 52 are coupled to a set of inputs of a tier comparator 54 which is an array of 8 comparators. A read-only memory (ROM) 56 has 8 conductors 58 coupled to corresponding inputs of tier comparator 54. ROM 56 is preprogrammed by the operator of the scrambling system to identify the tiers which the user of the descrambler is authorized to receive. For example, if a particular cable system subscriber wishes to receive and pay for tiers 3 and 7, for example, ROM 56 would have a HIGH logic level on the two conductors 58 corresponding to tiers 3 and 7. Only one conductor 52 can have a HIGH state at any time. Comparator 54 compares the signals on conductors 52 with the signals on corresponding conductors 58 and if there is a match of HIGH levels produces an output signal which is applied by way of a noise-reducing time delay circuit 60 to the input of an amplifier 62 to allow the pulses on conductor g to be applied to attenuator 18. In the absence of a match at the inputs of comparitor 54, indicating that the particular signal then being processed is not to be descrambled, comparator 54 produces a LOW output signal which when applied to the input of inverting amplifier 62 causes a HIGH output signal to be applied to the anode of diode 64 which holds conductor g' high which disables the descrambling.

Figure 4:
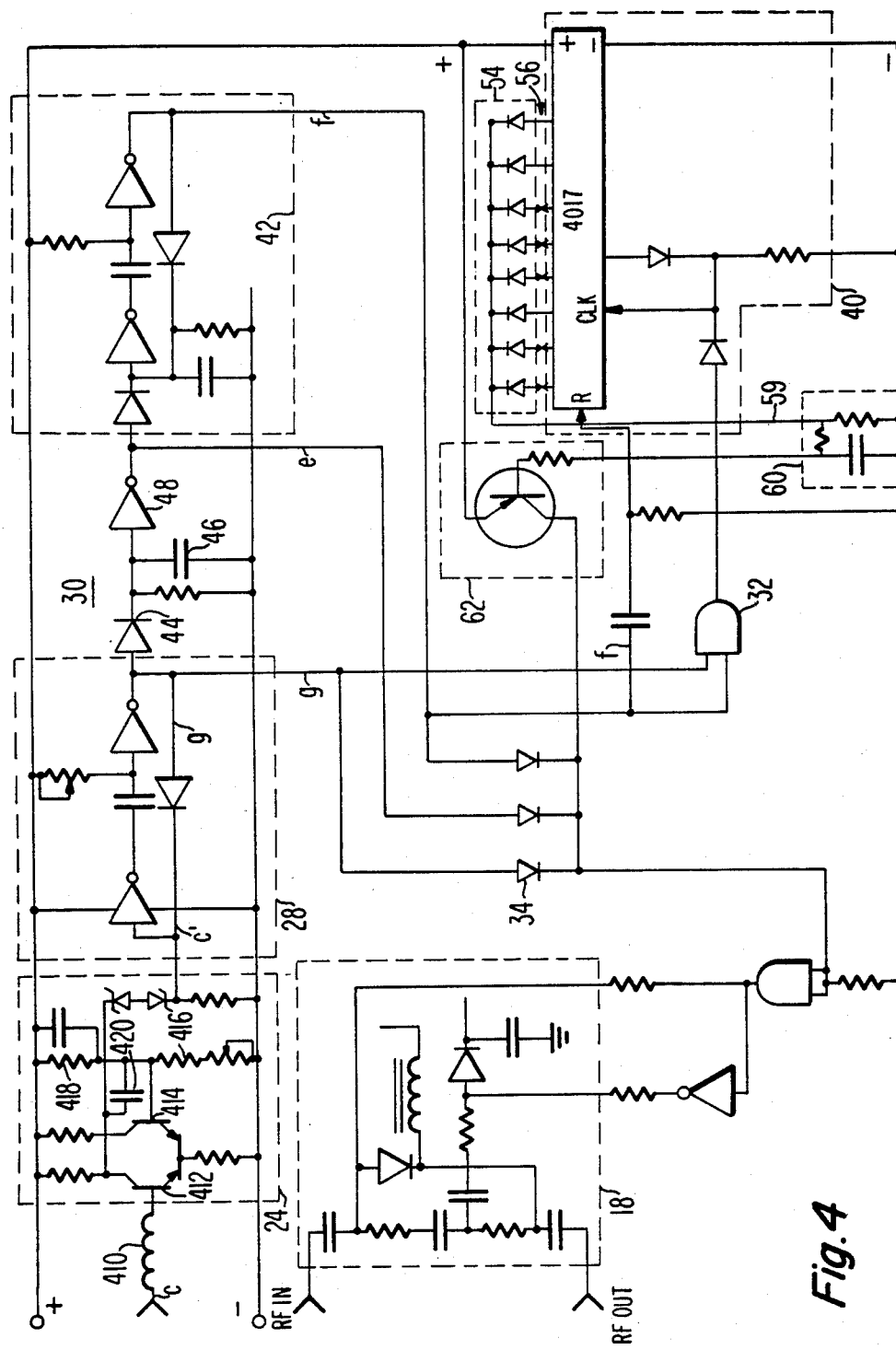
FIG. 4 is a schematic diagram similar to the arrangement of FIG. 1.

In FIG. 4, input conductor c receives detected pulses and couples them by way of an RF filter choke 410 to an input of a differential amplifier including transistors 412 and 414 for comparison with the voltage on a voltage divider including resistors 416 and 418. Comparator 24 is made regenerative by a capacitor 420 coupled to the collector of transistor 412 and the base of transistor 414. An output signal is taken through voltage-shifting diodes to a conductor c' which couples the signals to MVB 28 which is of standard configuration, as is MVB 42.

In FIG. 4, the arrangement of the counter, decoder, tier comparator, and allowable-tier ROM differs somewhat from that shown in FIG. 1. In FIG. 4, counter 40 includes a fully-decoded counter such as type 4017 which produces on one of its output terminals illustrated in FIG. 4 as 56 a signal indicative of the count. Terminals 56 are coupled to a diode array 54 which acts as a comparator, coupling a HIGH on any of the output terminals of counter 4017 to an output conductor 59. The memory function corresponding to ROM 56 is accomplished in the arrangement of FIG. 4 by breaking particular conductors 56 corresponding to the tiers which are not allowed. In the case of a printed-circuit assembly arrangement this corresponds to drilling holes through the pattern of conductors, and the memory is the remaining pattern.

As mentioned, a pattern of drilled holes may induce the user to jumper across the holes either with solder and wire or with a removable clip lead, if irreversible changes to the descrambler are to be avoided. This may be made more difficult by use of the security plug and receptacle of FIGS. 5-8. Receptacle 500 of FIG. 5 is adapted to receive a tier-determining plug 502. The contacts 514 of receptacle 500 are coupled to the tier-establishing portions of the descrambler. For example, the 12 contacts can be inserted into a printed-circuit (PC) board and interconnected with pins 56 of counter 40 and with diodes 54 of FIG. 4. Security plug 502 includes a PC board 511 having conductor paths 515 printed on both sides. The conductor pattern is preselected for the desired tier levels to be authorized. The system operator maintains a stock of descramblers without plugs, and a supply of plugs the conductor paths of which represent authorization for decoding of various tiers. When a new customer wishes a particular tier of service, the system operator simply inserts the apppropriate plug into the receptacle of a descrambler, and supplies it to the subscriber. The security plug-receptacle combination effects security by virtue of small size in conjunction with a form intended to make tampering difficult. The size of the plug is on the order of 5 cm long, 2.5 cm high and 1.7 cm wide. The corresponding sizes of the conductors are small enough to pose a real difficulty to inexperienced persons.

Two-sided PC board 511 is mounted within a rigid insulating housing 510 into which are formed ramps 516 and ribs 520. A rib 520 is adjacent each terminus 515 of the conductor pattern which is intended to make contact with corresponding pins 514 of the receptacle. As will be described, the ribs operate a cam for forming a positive contact.

Receptacle 500 includes a housing 513 formed from a semirigid plastic insulating material. Flexible pins or connectors 514 are molded into the housing at positions and spacings corresponding to the positions and spacings of terminals 515. The spacing between the rows of pins 514 exceeds the width of PC board 511 and its conductors. Consequently, a tamperer removing the PC board from its housing and modifying it would find upon insertion of the PC board into passage or slot 522 that contact by pins 514 cannot be made simultaneously to both sides of the PC board. Because of the small size of the assembly, he may not be able to determine the nature of the problem, and be unable to further modify the unit. When the PC board is within its housing 510 and the plug is mated with the receptacle, ramps 516 ride over cams 518 and force a bend at necks 517. This causes the inner surface of a cam to bear against pin 514 and force it inward, against the PC conductor. When the plug is withdrawn, cams 518 and pins 514 return to their original positions. If desired, one or more ramps 520 can be deleted from housing 510 as an additional confusion factor. The recessed pins 514 and small size make insertion of wires or other jumpers difficult and unstable.

The plug and receptacle of FIG. 6 are used and connected in generally the same manner as those of FIG. 5. The arrangement of FIG. 6 differs, however, in that a flexible PC board 611 is folded in a region 624. The "eye" formed by the fold is held within a semirigid plastic bracket 612 which attaches the flexible printed wiring board to housing 610. Receptacle 600 includes a narrow neck or opening 616 furcated by a divider 618. The spring connectors or pins 617 lie along the outsides of the furcated paths. When the plug is mated with the receptacle, folded board 611 divides into two parts at divider 618, and each half takes its own path. The conductor patterns of the board contact pins 617 to form the memorized pattern whioh establishes the tier level.

The terminals 615 of board 611 are recessed away from the opening in the housing to prevent tampering. Similarly, the location of terminals 617 and divider 618 discourage tampering.

Additional security is provided by an arrangement for locking the mated plug and receptacle together. As illustrated in FIG. 6, a portion 619 of semirigid bracket 612 is formed as a hook or latch which rides over a ramp 626 associated with a notch 620. When mated, hook 619 locks into notch 620, preventing withdrawal except by someone using a rigid tool 622 which fits through a hole 621 oriented adjacent ramp 626 to force hook 619 out of notch 620.

Figure 7:
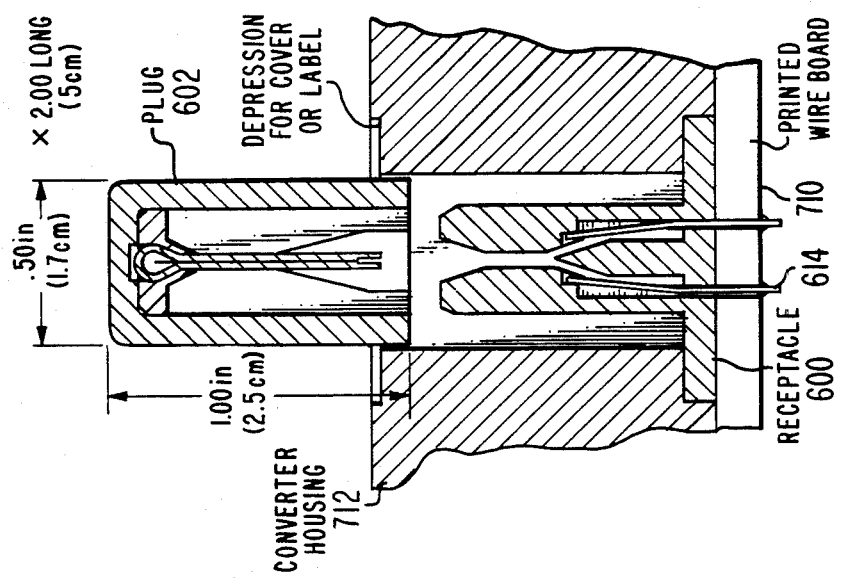
FIG. 7 illustrates the mounting of the plug and receptacle in a housing.

FIG. 7 illustrates a mounting arrangement for a plug and receptacle. In FIG. 7, a PC board 710 has printed conductors (not shown) to which pins 614 of receptacle 600 are soldered. The printed conductors electrically connect the active circuits (not shown) with the tier-determining memory established by the conductor patterns on board 611. A converter or descrambler housing 712 has an opening therethrough above receptale 600 sized to admit a plug 602. The tight fit, locking capability and small size all contribute to preventing removal of the plug.

Figure 8:
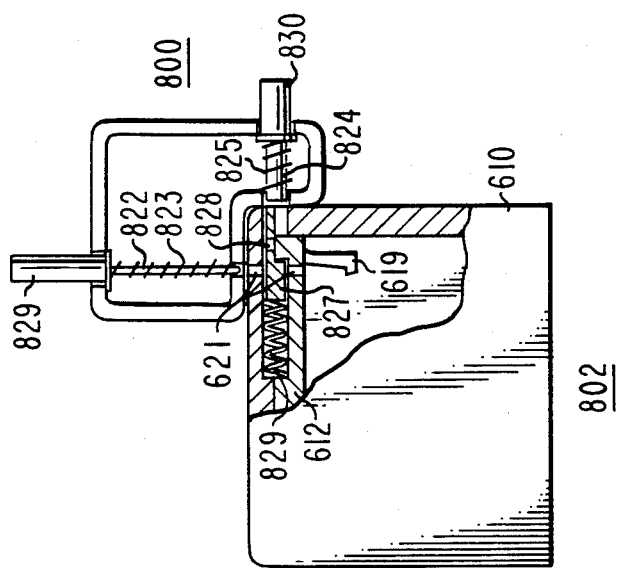
FIG. 8 illustrates an arrangement for increasing security.

FIG. 8 illustrates an improved locking arrangement for a mated plug-receptacle. The locking mechanism requires the aid of an auxiliary "key" apparatus 800. Plug 802 is similar to plug 602, except that keyhole or keyslot 621 is closed by a sliding plug 827 held in the closed position by a spring 829. Plug 827 prevents insertion of a key for pushing hook 619 aside to unlock the mated plug and receptacle. Key apparatus 800 includes a key assembly bracket 826 which supports rigid key 822 which is held in the retracted position by a spring 823, and also includes a second rigid key 824 held in a retracted position by a second spring 825. To disengage hook 619 from detent 620, key 800 is placed in the position illustrated adjacent the plug. Key plunger 830 is depressed, which allows a key slot 828 in sliding plug 827 to be aligned with key slot 621. Rigid key 822 is then pushed through slot 621 by pressing plunger 829, disengaging hook 619.

Other embodiments of the invention will be obvious to those skilled in the art. For example, any number of tiers may be identified, either more or less in number than eight as illustrated in the embodiment. The tier tags may be associated with the signals in manners other than amplitude-modulation onto an audio carrier. For example, for those cases in which the audio signal is modulated onto a supersonic subcarrier before modulation onto the audio carrier; the tier tages could be FM-modulated at baseband onto the audio carrier. Also, the tier tags could be sinusoidal rather than pulses. The tier tages could be modulated onto a pilot carrier or concealed portions of the chroma signal. The plugs and receptacles may have any number of pins for connecting to the counter and diodes.

What is claimed is:

1. An improved security arrangement for a television signal decoder, comprising:
   receiving means for receiving scrambled television signals, said scrambled signals including identification tier tags indicative of the nature of the program then being received:
   tier tag sensing means coupled to said receiving means for sensing said tier tags;
   controllable descrambling means coupled to said receiving means for descrambling said scrambled television signals when said controllable descrambling means is enabled;
   memory means associated with said decoder, the contents of said memory means establishing the tiers of programs to which said decoder will respond; and
   comparison means coupled to said tier tag sensing means and to said memory means for enabling said descrambling means when said tier tags are in a particular relationship with the contents of said memory for decoding said scrambled television signals;
   wherein the improvement lies in that said memory means comprises;
   first mating means coupled to said comparison means;
   second mating means adaptable for being physically mated with said first mating means for establishing electrical connections therewith; and
   electrical circuit means interconnected with said second mating means, the nature of said electrical circuit means being predetermined to establish said particular relationship for enabling said descrambling means for programs of particular natures of which said decoder is to respond; and wherein
   said first mating means comprises a multielement receptacle having spring contacts disposed on two sides of a channel;
   said second mating means comprises a multielement plug having contacts formed on a folded flexible printed circuit board for mating with said receptacle contacts, said board being secured at the fold thereof to one end of a housing, the opposite end of said housing having an opening to enable insertion of said board into said channel upon mating of said plug and receptacle;
   said electrical circuit means comprises a pattern of conductors disposed on said folded flexible printed circuit board; and wherein
   said receptacle includes a divider for bifurcating said channel such that when said plug and receptacle are mated said divider separates the ends of said folded flexible circuit board so as to bring said plug contacts into contact with said receptacle contacts.

2. An arrangement according to claim 1 wherein the largest dimension of said plug or receptacle is on the order of 5 cm.

3. An arrangement according to claim 1 further comprising locking means for locking said plug and receptacle together when mated.

* * * * *